United States Patent [19]

Trudeau

[11] Patent Number: 4,888,236
[45] Date of Patent: Dec. 19, 1989

[54] TORQUE ROD OF COMPOSITE MATERIAL

[75] Inventor: William H. Trudeau, Brighton, Mich.

[73] Assignee: O & S Manufacturing Company, Whitmore Lake, Mich.

[21] Appl. No.: 182,962

[22] Filed: Apr. 18, 1988

[51] Int. Cl.[4] .............................................. B27N 5/02
[52] U.S. Cl. .................................. 428/34.1; 428/34.7; 428/35.7; 428/36.9; 428/52; 428/131; 428/192; 428/542.8
[58] Field of Search ............... 428/36, 192, 34.1, 34.7, 428/35.7, 36.9, 52, 131, 542.8; 280/679, 682, 781, 688, 695, 700

[56] References Cited

U.S. PATENT DOCUMENTS 4,495,231 1/1985 Laskaris et al. .................. 428/137
4,629,644 12/1986 Matuska ............................ 428/137
4,666,753 5/1987 Matuska et al. .................. 428/137

Primary Examiner—Ellis P. Robinson
Assistant Examiner—P. J. Ryan
Attorney, Agent, or Firm—Gifford, Groh, Sheridan, Sprinkle and Dolgorukov

[57] ABSTRACT

A torque rod for a heavy duty motor vehicle includes a shaft and two ends, each end being selectively attachable to points on the vehicle's chassis. The rod is composed of a polymerizable composite material. The shaft is either of solid, hollow, or layered composition. As an option, the shaft includes two adjustably interlocking halves enclosed and overlapped by a slidable sleeve. The sleeve is provided with a hole for the insertion of a bonding and filling material to fix the selected interlocked position to fit the chassis as needed.

18 Claims, 4 Drawing Sheets

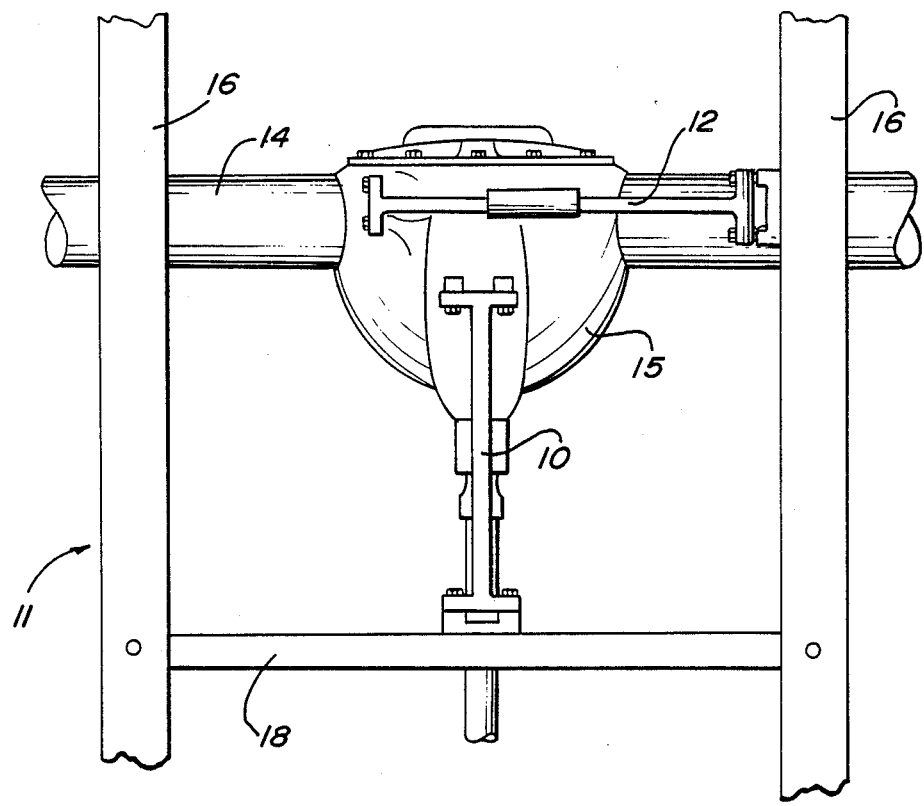
Fig-1
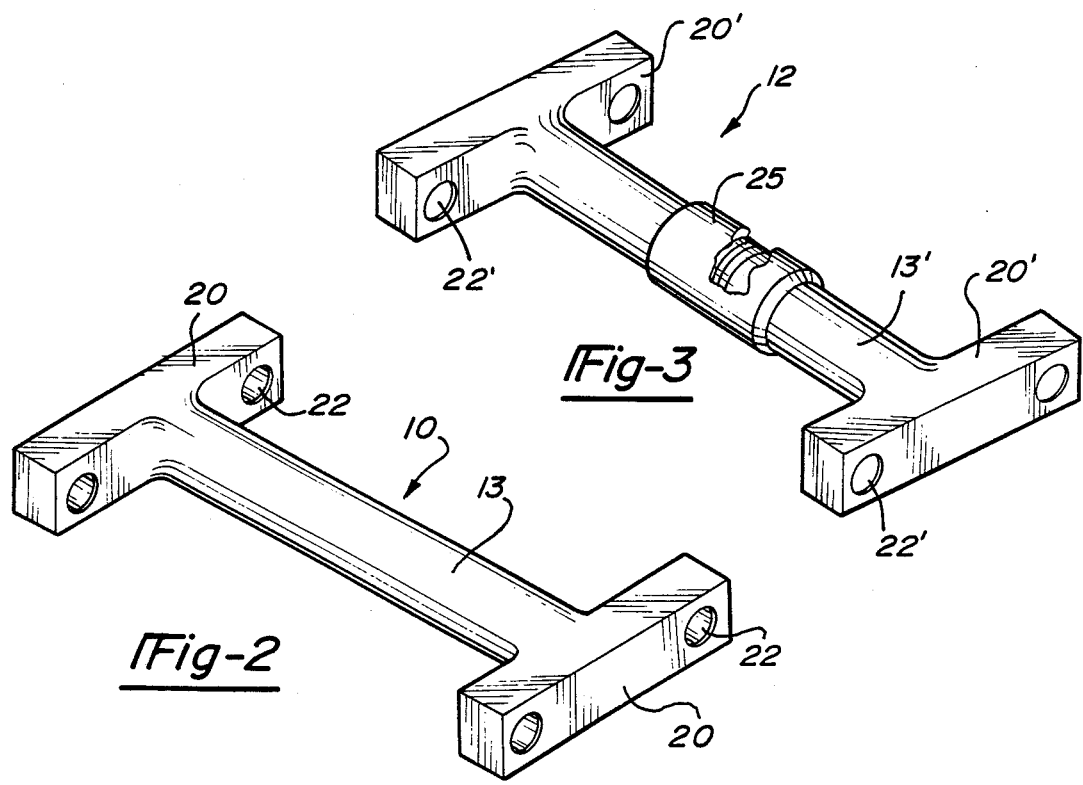
Fig-2
Fig-3

TORQUE ROD OF COMPOSITE MATERIAL

BACKGROUND OF THE INVENTION

I. Field of the Invention

The invention relates to torque rods, and more particularly, to torque rods for heavy duty vehicles composed of a polymerizable composite material. Such rods are typically used to interconnect elements of the vehicle's drive train with the vehicle's chassis to relieve strain and to stabilize the drive train while the vehicle is accelerating, stopping, or articulating from road and terrain conditions. The rods may be fixed axially, laterally or obliquely relative to the differential housing and the chassis.

II. Description of the Prior Art

Torque rods are well known for use in heavy duty motor vehicles, particularly on those vehicles with tandem axle suspensions. Present rods are composed substantially of steel, and include a steel shaft with two straddle mount ends each having a transverse aperture defined therein forming a socket. The straddle mount ends have mounting flanges with apertures defined therein for attachment to selected points on the chassis and drive train.

There are two basic types of straddle mount ends. The first type includes a central ball with two outwardly extending mounting flanges fitted into each socket. Interfitted between the ball and the socket is an insulating, lining material composed of a plastic or a metal. The ball and related liner is fixed into the socket by one or more rings that are of the snap ring design, press fitted, staked or flanged into position. This construction allows for full rotation and high angulation of the ball relative to the socket.

The second type of straddle mount end includes a cylindrical pin body with two outwardly extending flanges fitted into each socket. Interfitted between the pin body and the socket is an insulating, lining material composed of a rubber. On assembly the rubber is deformed so as to become seized to the inner surface of the socket and the surface of the cylindrical pin body. This construction restricts both angulation and rotation of the pin relative to the socket.

There are several disadvantages of the prior art which render conventional constructions undesirable. First, the conventional torque rod is heavy, weighing about 20 pounds. Second, the conventional rod is difficult and costly to manufacture, requiring virtually flawless steel castings or forgings, expert machining and difficult assembly with heavy presses and the like. Third, because of the difficulty of manufacture and the high cost of necessary materials, the conventional rod is costly to produce and replace. Fourth, the insulating, lining material conventionally interfitted between the ball and the socket is prone to wear. And fifth, the length of the conventional torque rod is incapable of being conveniently adjusted, thereby virtually eliminating interchangability between vehicle brands.

BRIEF SUMMARY OF THE PRESENT INVENTION

In accordance with this invention, a torque rod being of a polymerizable composite construction and optionally being adjustable in length is disclosed. Where the rod is of a one-piece construction, the rod ends having flanges are unitized with the rod shaft. The rod shaft may be hollow, solid, or laminated with a plurality of concentric layers.

Where the rod is of two-piece construction, the construction and composition is substantially the same as the rod of one-piece construction, except that the shaft is divided into two halves, each half having ends which are loosely interlockable with one another. Over the interlockable rod ends is slidably provided a sleeve having an injection aperture defined therein. After the two halves are adjusted relative to one another to achieve a preferred length (such adjustment being made before or after the halves are fitted to the vehicle), the sleeve is slid over the interlocked portion and a sealant-bonder is injected into the aperture to fill the channel at the interlocked area. Once cured, the halves are substantially bonded into one unit.

The torque rod according to this design overcomes the disadvantages identified with respect to conventional torque rods. First, the composite torque rod is less than half the weight of conventional rods. Second, construction including molding and grinding or shaving, if necessary, is relatively simple. Third, the resulting production and replacement costs are low. Fourth, because no insulating, lining material is used, wear will be virtually eliminated. And fifth, composite construction according to the present invention allows for easy adjustment of torque rod length.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 1 is a top plan view of a conventional heavy duty motor vehicle chassis with the struts according to the present invention in place thereon;

FIG. 2 is a perspective view of an embodiment of a strut according to the present invention;

FIG. 3 is a perspective view of an alternate embodiment of a strut according to the present invention;

DETAILED DESCRIPTION OF THE PREFERRED EMBODIMENTS OF THE INVENTION

Figure 4:
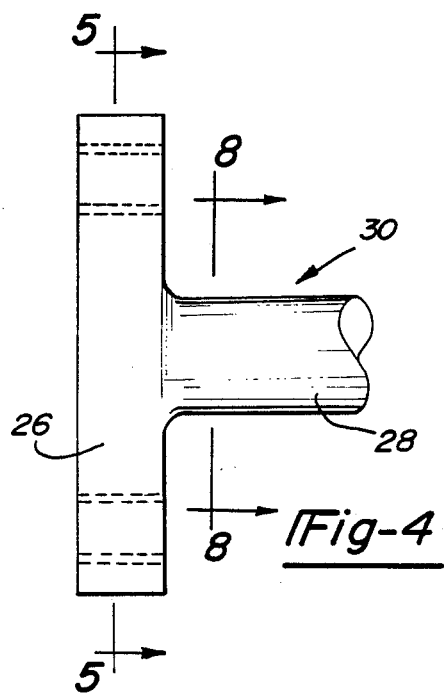
FIG. 4 is a top plan view of a strut end of the present invention.

With reference first to FIG. 1, there is shown a conventional heavy-duty vehicle chassis indicated generally by 11. The chassis 11 may belong to a truck, a refuse hauler, a grader, or any heavy duty vehicle which uses a conventional torque rod. The chassis 11 conventionally comprises a pair of side members 16, a cross member 18 and a rear-end 14 which includes a differential housing 15.

Attached to selected portions of the chassis 11 are two torque rods including an adjustable torque rod 12 and a nonadjustable torque rod 10. By way of example, the adjustable rod 12 interconnects the differential housing 15 and one of the side members 16 as illustrated, whereas the nonadjustable rod 10 interconnects the differential housing 15 and the crossmember 18.

Of course, other applications of the torque rods on a chassis are possible. While the torque rods are shown as interconnecting the differential housing 15 to selected points on the chassis 11, it is to be understood that torque rods may be interfitted between other points of the chassis and drivetrain, such as is typically known in the four spring suspension.

With reference to FIG. 2, a closer view of the nonadjustable rod 10 is shown. The nonadjustable rod 10 includes a shaft 13 having two substantially identical straddle ends 20. The straddle ends 20 have two apertures 22 defined therein.

With reference to FIG. 3, a closer view of the adjustable rod 12 is shown. The adjustable rod 12 includes a shaft 13' and two substantially identical straddle ends 20'. The straddle ends 20' have apertures 22' defined therein. A sleeve 25 is provided for interlocking as will be discussed in detail below with respect to FIGS. 11-13.

The nonadjustable rod 10 of FIG. 2 and the adjustable rod 12 of FIG. 3 are composed of a polymerizable composite material and may be molded as a single unit or in sections. Further detail of the composition of the rods according to the present invention will be discussed below with reference to FIGS. 8-10.

With reference to FIGS. 4-7, alternate embodiments of torque rod ends according to the present invention are disclosed. In each instance, the ends are composed of a polymerizable composite material.

Specifically referring to FIG. 4, a one-piece, straight shaft strut end 30 is shown. The end 30 includes a straight shaft portion 28 and a base porton 26, both of which are of unitized construction.

Figure 5:
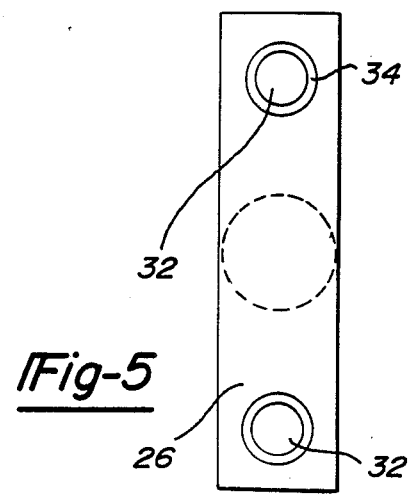
FIG. 5 is a sectional view along line 5—5 of FIG. 4.

FIG. 5 is a view taken along line 5—5 of FIG. 4 and shows the base portion 26 in section. The base portion 26 has defined therein a pair of apertures 32 which may be lined with a metal bushing insert 34. The apertures 32 and the inserts 34 are also indicated by broken lines in FIGS. 4, 6 and 7.

Figure 6:
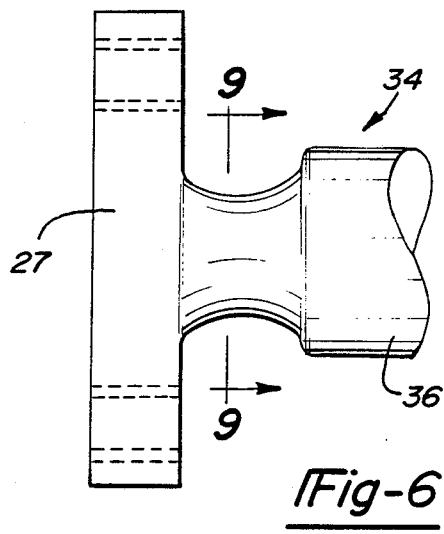
FIG. 6 is a top plan view of an alternate end of the present invention.

Referring to FIG. 6, a one-pieced, flared shaft strut end 34 is shown. The end 34 includes a flared shaft portion 36 and a base portion 27, both of which are of unitized construction.

Figure 7:
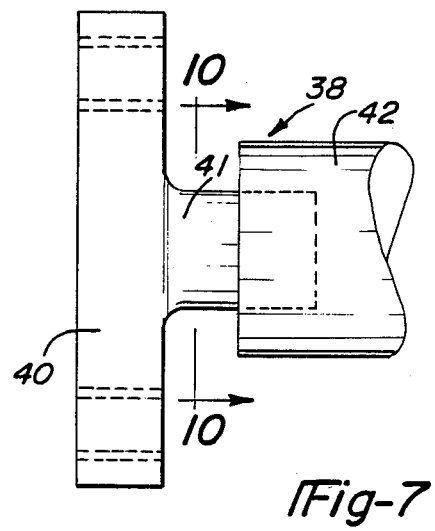
FIG. 7 is a top plan view of another alternate end of the present invention.

With reference to FIG. 7, a further embodiment of a torque rod end is illustrated. FIG. 7 shows a two-piece strut end 38 which is comprised of a base portion 40 having a portion stud 41 which is fitted into shaft portion 42. The base stud 41 may be secured into the shaft 42 by conventionally known bonding methods.

As was indicated above with respect to the FIGS. 2 and 3, the compositions of a torque rod according to the present invention will now be discussed with reference to FIGS. 8-10.

Figure 8:
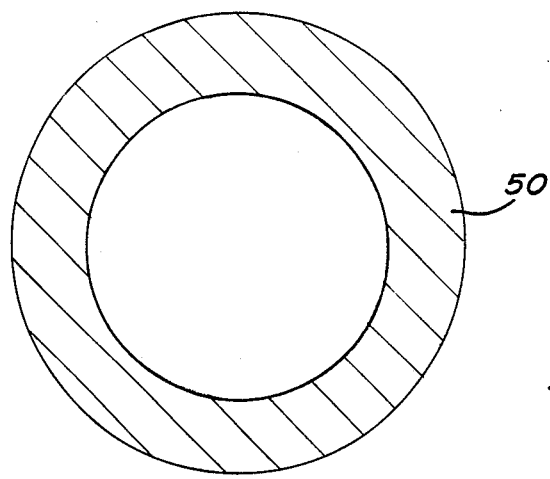
FIG. 8 is a sectional view taken along line 8—8 of FIG. 4.

Referring to FIG. 8, a sectional view taken along line 8—8 of FIG. 4 is shown. However, it must be understood at the outset with respect to FIGS. 8-10 that while various compositions are shown in relation to particular ends as shown in FIGS. 4, 6 and 7, this is by way of example only, as each end is not necessarily limited to the construction shown in the related FIGS. 8-10.

FIG. 8 shows a substantially hollow shaft body 50 which is composed of a polymerizable composite material.

Figure 9:
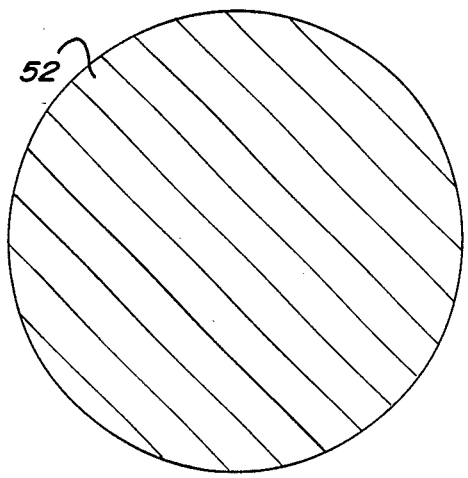
FIG. 9 is a sectional view taken along line 9—9 of FIG. 6.

Conversely, FIG. 9 shows a solid shaft body 52 which is also composed of a polymerizable composite material.

Figure 10:
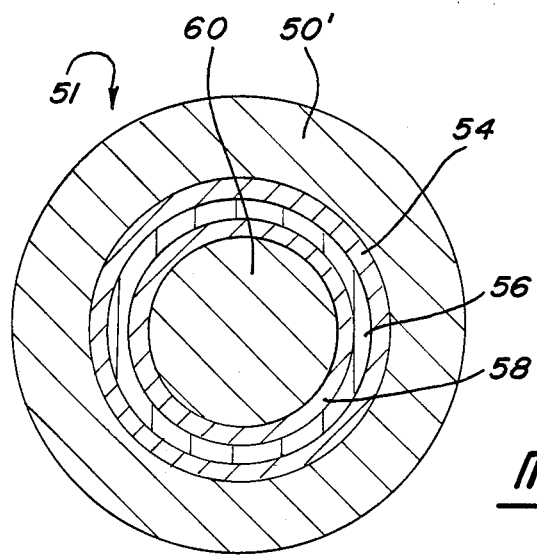
FIG. 10 is a sectional view taken along line 10—10 of FIG. 7.

To further illustrate the flexibility of composite construction as applied to the present invention, FIG. 10 shows a multi-layered, laminated shaft body, generally indicated by 51, which includes an outer layer 50', a third inner layer 54, a second inner layer 56, a first inner layer 58 and a core 60. This multi-layered construction provides greater strength and resilience without increasing weight or size.

In order to provide the torque rod according to the present invention with maximum flexibility in use, a construction method is provided by which the length of the rod is alterable so that the rod may be fitted to a variety of heavy duty vehicles. This method is described with reference to FIGS. 11-13. The polymerizable composite construction enables this method to be accomplished.

Figure 11:
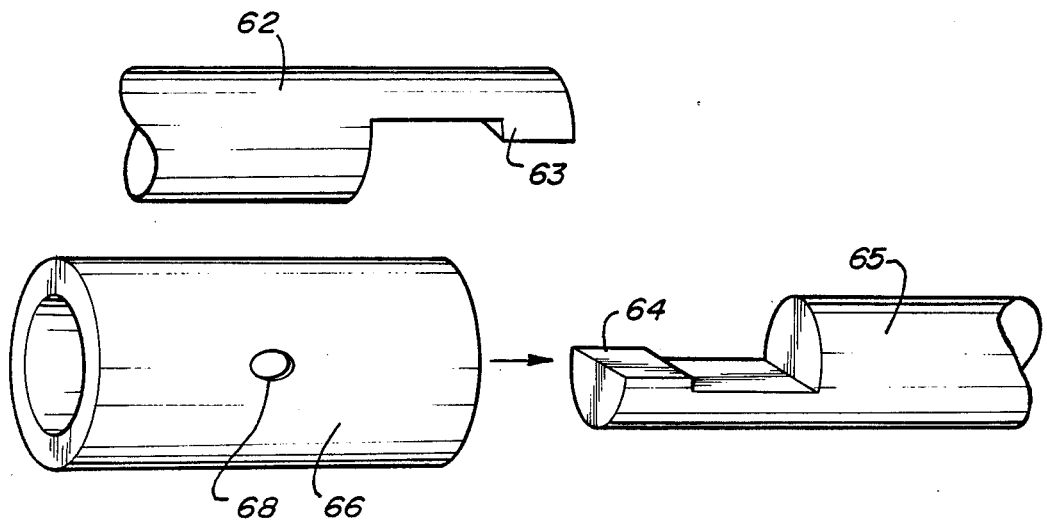
FIG. 11 is a partial perspective view of two half-shafts and a sleeve.

Referring to FIG. 11, there is shown a first half torque rod shaft 62 having an interlockable end portion 63 which is loosely interlockable with an interlockable end portion 64 of a second half torque rod shaft 65. The end portions 63, 64 are configured so as to allow both lateral and axial play when interlocked.

Also provided is a sleeve member 66 which is slidably fittable over either of the torque rod halves 62, 65. The member 66 has defined therein injection aperture 68. The aperture 68 may be fitted with a cover or similar closure device (not shown) as preferred.

The portions having been described, the method for interlocking them will now be discussed.

First, and still referring to FIG. 11, the sleeve member 66 is slidably mounted over one or the other of torque rod halves 62, 65.

Second, each of the halves 62, 65 is then fixed to its preferred position on the heavy duty vehicle chassis. The halves 62, 65 are positioned so that the ends 63, 64 substantially interlock. Because the ends 63, 64 only loosely interlock, the length of the torque rod may be altered as required.

Figure 12:
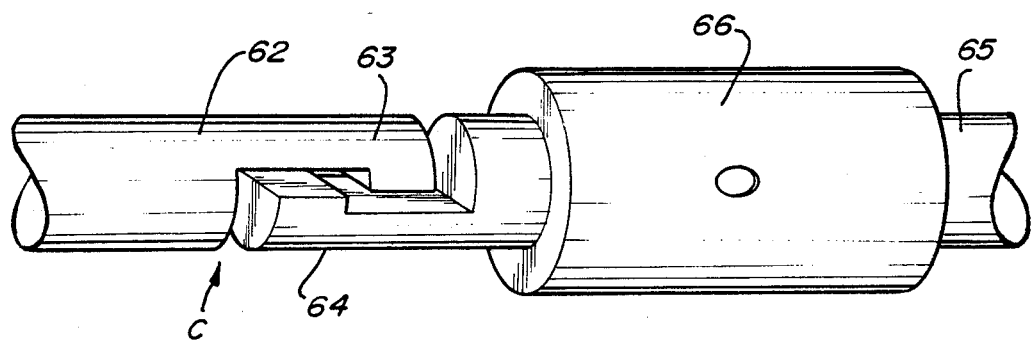
FIG. 12 is a perspective view of the components of FIG. 11 with the sleeve on a shaft moved off to one side and the two half-shafts in an overlapped position.

The resulting interlocking relationship is best shown in FIG. 12. With reference thereto, the sleeve member 66 is in place on rod half 65 and rod half 65 is substantially interlocked with rod half 62. As indicated by C, a channel is created between the two end portions 63, 64 when the halves 62, 65 are in the interlocked position.

Figure 13:
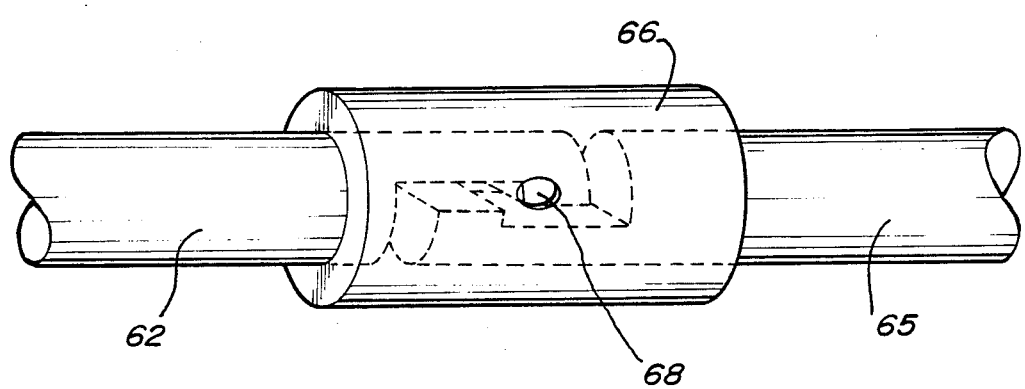
FIG. 13 is a modified view of FIG. 12 with the sleeve positioned over the overlapped ends of the half-shafts.

Third, and referring now to FIG. 13, once the two halves 62, 65 are interlocked, the sleeve 66 is slid substantially over the end portions 63, 64 so that they are fully encapsulated. The close tolerances of the sleeve 66 in its relationship with the halves 62, 65 results in the centering of each half 62, 65 relative to one another. The aperture 68 is positioned to approximately align with the channel C (outlined by broken lines).

A curable or self-curing fluid or semifluid sealant-bonder (not shown) is thereafter injected into the aperture 68 until the channel C is completely filled. The sleeve 66 may immediately thereafter be partially rotated around the interlocked halves thereby locking the sealant-bonder inside, or a cover (not shown) may be placed over the aperture 68.

The sealant-bonder is preferably capable of chemically interacting with the polymerizable composite material of the halves 62, 65 and the sleeves 66 so that, when cured, these components are bonded essentially as one, thereby resulting in a unitized torque rod.

Having set forth the present invention and what is considered to be the best embodiments thereof, it will be understood that changes may be made from the specific embodiments set forth without departing from the spirit of the invention exceeding the scope thereof as defined in the following claims.

I claim:

1. A torque rod preform for a heavy duty motor vehicle comprising:
   a substantially cylindrical, axially elongated body having a first mounting end and a second mounting end; and
   said body and said mounting ends being unitized and being composed of a polymerizable composite material.

2. A torque rod preform according to claim 1 wherein at least one of said first mounting end and said second mounting end is substantially perpendicular to the axial length of said body.

3. A torque rod preform according to claim 2, wherein said at least one of said first mounting end and said second mounting end has at least one aperture defined therein.

4. A torque rod preform according to claim 3, wherein said aperture is fitted with a metallic bushing.

5. A torque rod preform according to claim 2, wherein said at least one of said first mounting end and said second mounting end has two apertures defined therein.

6. A torque rod preform according to claim 1, wherein said body is substantially hollow.

7. A torque rod preform according to claim 1, wherein said body is substantially solid.

8. A torque rod preform according to claim 1, wherein said body comprises multiple concentric layers.

9. A torque rod preform for a heavy duty motor vehicle comprising:
   a substantially cylindrical, axially elongated body composed of a polymerizable composite material; and
   said body including a first portion and a second portion, said portions being loosely interlockable to form an interlocked area and a sleeve slidable from a first position on one of said first or second portions to a second portion over said interlocked area of said first portion and said second portion when said portions are loosely interlocked.

10. A torque rod preform according to claim 9, wherein said sleeve has at least one bonding and filling material receiving aperture defined therein.

11. A torque rod preform according to claim 9, wherein:
    said first portion has a first attachment extremity and a first interlocking extremity;
    said second portion has a second attachment extremity and a second interlocking extremity; and
    said interlocking extremities having bonding and filling material receiving spaces defined therebetween when loosely interlocked.

12. A torque rod preform according to claim 11, wherein said first interlocking extremity and said second interlocking extremity are substantially identical.

13. A torque rod preform according to claim 11, wherein:
    a first shaft interconnects said first attachment extremity and said first interlocking extremity;
    a second shaft interconnects said second attachment extremity and said second interlocking extremity;
    said first interlocking extremity includes a first axially elongated outer surface having a substantially semi-circular cross-section and having at least two axially provided, non-coplanar first inner surfaces with at least one of said non-coplanar first surfaces being contiguous to said first shaft;
    said contiguous first surface having a width narrower than the other non-coplanar first surface;
    said second interlocking extremity includes a second axially elongated outer surface having a substantially semi-circular cross-section and having at least two axially provided, non-coplanar second inner surfaces being contiguous to said second shaft; and
    said contiguous second surface having a width narrower than the other non-coplanar second surface.

14. A torque rod preform according to claim 11 wherein said first attachment extremity and said second attachment extremity include attachment means for attaching said strut to a heavy duty motor vehicle chassis or drive train.

15. A torque rod preform according to claim 14 wherein said extremities each include one end which is substantially perpendicular to the axial length of said body.

16. A torque rod preform according to claim 15 wherein at least one of said ends has at least one aperture defined therein.

17. A torque rod preform according to claim 16 wherein said at least one aperture is lined with a metallic bushing.

18. A torque rod preform according to claim 9, wherein said body is substantially solid.

* * * * *